United States Patent Office 3,381,520
Patented May 7, 1968

3,381,520
SONIC ANALYSER
Fernand Bourquard, Courbevoie, and Roger Brouee, Sevres, France, assignors to Commissariat à l'Energie Atomique, Paris, France
Filed Oct. 19, 1964, Ser. No. 404,834
Claims priority, application France, Oct. 29, 1963, 952,075
2 Claims. (Cl. 73—24)

ABSTRACT OF THE DISCLOSURE

A sonic analyser has a fluid-tight vessel and a sound pipe having a reed pipe mouth of predetermined length in the vessel. A device regulates the gas flow through the pipe to obtain a frequency in a selected harmonic range. An acoustic detection system is connected to a measuring and recording unit for reading the frequency and is located in the vessel adjacent the open end of the pipe. A casing surrounds the apparatus within the fluid-tight vessel to provide a substantially constant temperature from a heater element about the casing.

---

The present invention relates to a sonic analyser which is designed for the accurate determination of the velocity of sound in a gas and which also makes it possible, by suitable analysis of the results, to take measurements of contamination of a gas by a foreign gas, of the temperature of a pure gas, etc.

The primary object of the invention is to provide an apparatus of simple design for the purpose of achieving an improvement both in the precision and rapidity of the result, remarkable reliability of operation and an appreciable reduction both in weight and overall size of the apparatus employed.

To this end, the sonic analyser according to the invention is characterized in that it comprises within a fluid-tight vessel, a sound pipe having a reed-pipe mouth of predetermined length, a device for regulating the gas flow through said pipe in order to obtain a frequency in a selected harmonic range, and an acoustic detection system connected to a measuring and recording unit for the purpose of reading the frequency.

Since the length $l$ of the sound pipe is known, and since the measured frequency $f$ is also known as well as the order $k$ of the selected harmonic, the velocity of sound within the gas can therefore be readily determined according to the law of open pipes, for example, by means of the relation $V=2lf/k$.

Apart from the main arrangement stated in the foregoing, the sonic analyser which is proposed also has a number of secondary characteristic features which will be described in greater detail hereinafter and which relate especially to:

The admission of gas within the sound pipe by means of a coil placed in the vicinity of the outer wall of the fluid-tight vessel;

The utilization of an outer casing having a substantially constant temperature and containing the entire apparatus, thereby preventing any disturbance caused by the surrounding atmosphere;

The presence of a ventilating-fan and a resistance-type heater element which is disposed within the casing and controlled by a thermostat so as to reduce the temperature gradients around the fluid-tight vessel and to obtain within the interior of said vessel a practically constant and uniform temperature which is not influenced by any thermal variations of the location in which the apparatus is placed;

And the optional feature which consists in joining said fluid-tight vessel to the outer casing by means of a flexible suspension so as to prevent any mechanical vibrations of the sound pipe.

Further characteristic features of the invention which apply more particularly to the design of the acoustic detection system and of the associated measuring unit, and also to the design of the device for regulating the flow rate will also be set forth in detail in the following description of one example of embodiment which is given solely by way of indication and not in any limiting sense.

Figure 1:
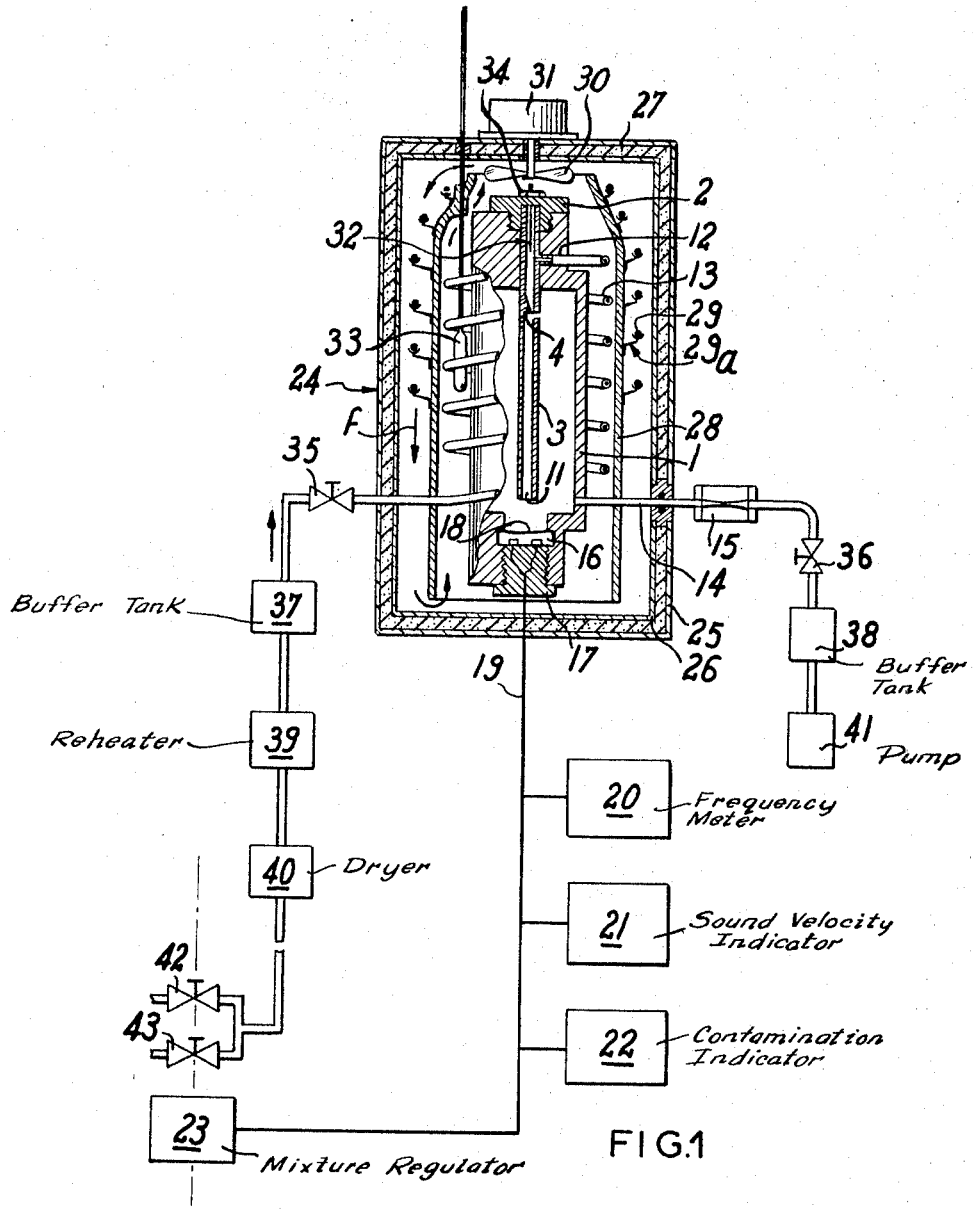
FIG. 1 is a diagrammatic vertical sectional view of a sonic analyser as constructed in accordance with the invention.
Figure 2:
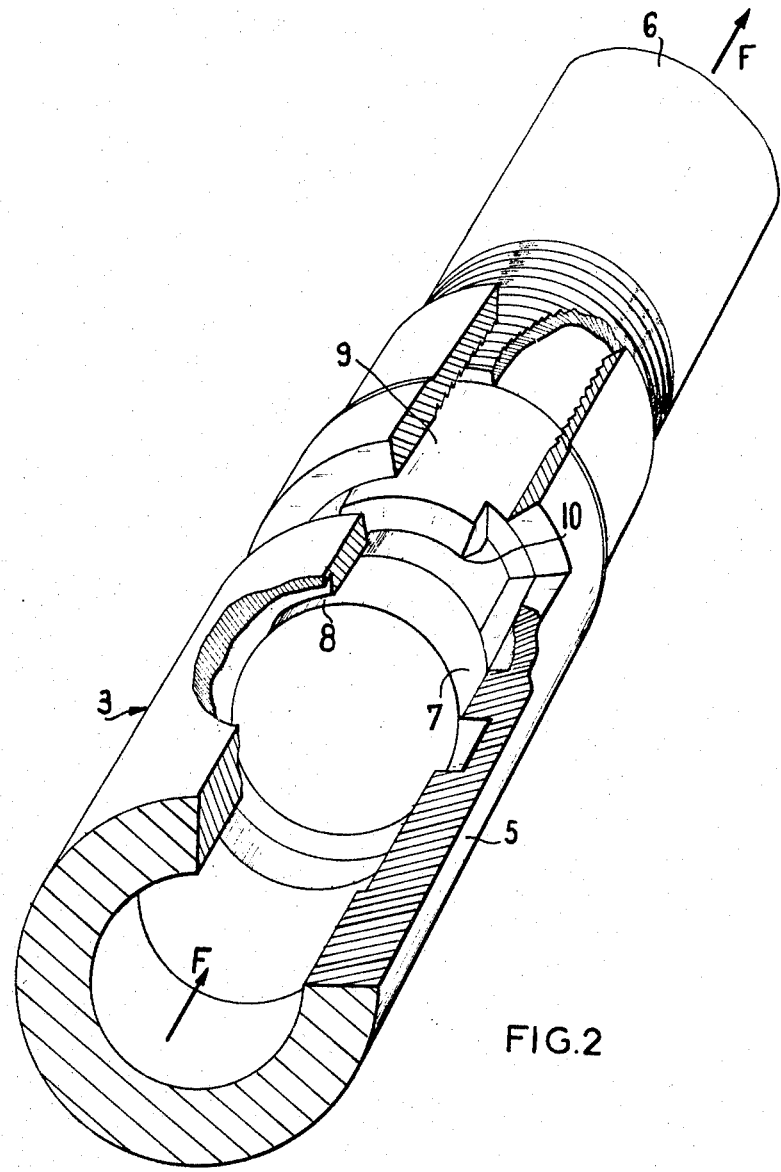
FIG. 2 is a view in perspective which illustrates the characteristic constructional arrangement of the sound pipe.

As can be seen from FIG. 1, the apparatus is essentially composed of a fluid-tight vessel 1 which can be either pressurized or depressurized. The said vessel 1 is closed at the top end by a plug 2 in the axis of which is fixed a sound pipe 3 provided with a reed-pipe mouth 4, the constructional details of which are more readily apparent from FIG. 2. As can be seen from this figure, the sound pipe is composed of two sections 5 and 6 which are adapted to screw one into the other. An obturating pastille 7 is mounted within the pipe-section 5 and a slit 8 is formed between the external surface of said pastille and the wall of the sound pipe 3 so as to withdraw the gas stream which circulates within said sound pipe in the direction of the arrow F. A ring 9 is fitted on the downstream side of the pastille 7 and is machined with high precision so as to present a chamfered circular opening 10 which is placed opposite the slit 8. The purpose of this arrangement is to produce the vibration of the gas within the extension of the sound pipe 3, this latter having a predetermined length so as to produce through the mouth 4 a sound whose acoustic properties (frequency in particular) have been chosen especially as a result of systematic preliminary tests. It should be pointed out in this connection that the object of such tests is on the one hand to obtain a sound having a stable pitch over a wide range of operation and, on the other hand, to define the technological conditions of fabrication of the various components of the sound pipe so as to permit of convenient interchangeability of these latter.

The sound pipe 3 is open at the bottom end 11 thereof and is provided near the other end with a connecting branch 12 for the admission of gas within the sound pipe. For this purpose, said connecting branch 12 is connected outside the vessel 1 to a coil 13, the turns of which surround the wall of said vessel while being spaced at a certain distance away from said vessel wall with a view in particular to permitting the insertion of a thermostat, as will be explained hereinafter.

A conduit 14 is provided in the bottom portion of the vessel 1 so as to permit the removal of the gas which is discharged from the sound pipe 3, said conduit being connected to a flow-regulating device 15, that is to say a device which permits the possibility of regulating the gas flow under optimum operating conditions. The said device 15 consists, for example, of a thin-walled calibrated nozzle or of a venturi-tube system comprising a combining and diverging nozzle with a sonic throat.

Opposite the lower extremity 11 of the sound pipe 3, there is mounted in the vessel body an acoustic detection device 16 which is intended to record the frequency of the sound within the pipe 3 and which is rigidly held in position by means of a fixing plug 17. As an advantageous feature, the aforesaid device 16 comprises a vibrating diaphragm 18 which has minimum acoustic impedance and of similar design to those which are customarily employed in telephone receivers. The said diaphragm is connected by means of an assembly of suitable electrical lead-wires 19 to electronic measuring circuits comprising one or a number of the following devices and in particular a frequency meter 20, a sound velocity indicator 21, a device 22 for indicating the percentage of contamination of a pure gas by another gas, and a mixture regulator 23. The functions of these devices will become more readily apparent from a description which will be given later in connection with the various possible applications of the sonic analyser under consideration.

In accordance with the invention, the fluid-tight vessel 1 is placed, if necessary through the intermediary of a flexible suspension (not shown in the drawings), in the interior of a second vessel 24, the internal temperature of which is subject to very little variation. The said second vessel preferably has the shape of a closed box, the external wall 25 and internal wall 26 of which are separated from each other by insulating material 27 such as glass wool, for example. In the space which is formed in the interior of the box 24 around the vessel 1, there is mounted an annular sleeve 28 on which are fixed supports 29a for an electric resistance-type heater element such as the element 29 which is accordingly placed within the space formed between the internal wall of the box or casing 24 and the external surface of the sleeve 28. The heat generated by said resistance heater element makes it possible under these conditions to produce by convection (in the direction of the arrows $f$) an internal current of air around the sleeve 28 which plays a major part in providing uniformity of temperature around the vessel 1 within the casing 24. A fan 30 driven by an electric motor 31 effectively serves to improve the circulation of air referred-to-above.

Finally, a thermometer probe 32 and a thermostat 33 complete the apparatus. The probe 32 is fixed in the center-line of the sound pipe 3 while being maintained against the top cap 2 of the vessel 1 by means of a suitable system of fixation 34 before being connected to a control apparatus (which has not been illustrated in the drawings). The thermostat 33, which is placed substantially parallel to the sound pipe within the space formed between the vessel 1 and the sleeve 28 inside the turns of the coil 13 as shown in FIG. 1 and the position of which can be adjusted as a result of systematic tests by being inserted to a greater or lesser extent within the apparatus, permits of automatic regulation of the temperature around the vessel 1 by adequate control over the heater element 29. By way of example, the thermostat which is employed can be a simple mercury thermometer fitted with a relay which either opens or closes the heater element control circuit.

There are also shown in FIG. 1 a number of different ancillary devices which control the admission of gas within the sound pipe and which consist in particular of an inlet valve 35 which is connected to the coil 13, an outlet valve 36 which is connected to the flow-regulating device 15 and buffer tanks or chambers 37 and 38 for the purpose of absorbing any possible disturbances in the gas flow. Provision is made for a reheater 39 and a dryer 40 as well as a distributing pump 41 which permits the possibility of recycling the gas within the fluid-tight vessel, the operation of these devices being dependent on the various applications and conditions of utilization of the apparatus. Valves 42 and 43 are also capable of controlling the general admission of gas or a mixture of gases within the apparatus for the purpose of taking the desired measurements in this latter.

The operation of the sonic analyser which has just been described can readily be deduced from the foregoing. Accordingly, in order to measure the velocity of sound in a given gas by means of this apparatus, it is in fact merely necessary to open the valves 35 and 36 to a suitable extent in order to permit the circulation of gas within the sound pipe, the gas flow rate having previously been regulated by determining the characteristics of the nozzle 15. It should be noted in this connection that the choice of a nozzle having a sonic throat and designed to regulate, not the flow rate, but the flow velocity of the gas permits the possibility of completely eliminating any disturbances on the downstream side of the apparatus whilst the use of the buffer tank 37 on the upstream side makes it possible to absorb those disturbances which are liable to occur prior to admission of the gas within the sound pipe. In this manner, the flow rate within the apparatus is stabilized automatically between the sonic venturi and the upstream tank, said flow rate being substantially proportional to the upstream pressure.

Inasmuch as the length of the sound pipe has been determined by design, a reading is taken either of the vibrational frequency of the diaphragm 18 by means of the frequency meter 20 or of the velocity of sound by means of the measuring instrument 21, the circuits of which directly carry out the convertion of the value of the frequency according to the formula previously given, or alternatively, both readings are taken simultaneously.

Among the advantages which are gained by precise knowledge of the velocity of sound in a gas (it should be noted by way of example that it is necessary to determine this velocity at different points of systems for the circulation of gases in compressors which are under experimentation), emphasis should be laid on those advantages which permit the use of the proposed sonic analyser for the specific purpose of measuring the contamination of a gas by a foreign gas which has a different density. It is in fact known that, under predetermined conditions of temperature and pressure, the velocity of sound in a gas is a decreasing function of its density. The pollution of one gas by another therefore results in a variation in the velocity of sound within the mixture and makes it possible to determine the volume percentage of the foreign gas in the pure gas. In the case of a contaminating gas having a density which is 10 times lower, for example, the degree of precision achieved is of the order of $\frac{1}{10,000}$. In other words, it is possible by means of the apparatus considered to detect the presence of one molecule of contaminating gas in 10,000 molecules of contaminated gas. Finally, the sonic analyser also permits the possibility of measuring the temperature of a pure gas inasmuch as the velocity of sound is a known function of this temperature. By way of indication, the precision obtained by means of the analyser which is proposed can in practice be of the order of $\frac{1}{100}$ of a degree by virtue of the particularly careful construction of the fluid-tight vessel and of the insulating casing which surrounds the apparatus and also by reason of the thermal regulation of the atmosphere which is present between these two elements. An apparatus is thus produced which has high sensitivity and high fidelity as well as providing possibilities of calibration in the case of different gases. Moreover, the special constructional design of different vessels or casings, the automatic regulation of temperature and the use of a demountable and readily replaceable device for establishing the rate of flow permit the utilization of the apparatus in a noisy medium or a medium which is subject to high thermal differences.

It will be understood that the invention is not limited in any sense to the form of embodiment which has been described and illustrated and which has been given solely by way of example. In particular, and as has already been stated in the foregoing, the determination of the predominant harmonic range depends, according to the different conditions of operation and utilization of the apparatus, on the nature of the gas considered, on the dimensions of the sound pipe, on the ease of generating vibrations and on stability of operation in the steady state.

What we claim is:

1. Sonic analyser for the measurement of the velocity of sound in a gas, comprising a fluid tight vessel, a sound pipe in said vessel of predetermined length, a reed-pipe mouth for said sound pipe, means for regulating the flow of a gas through said sound pipe to obtain a frequency in a selected harmonic range, an acoustic detection system in said vessel, a measuring and recording unit connected to said system for reading said frequency, a buffer tank outside said vessel, a coil spaced around the external wall of said vessel, said gas being admitted within said sound pipe after passing said buffer tank and through said coil, a casing, said vessel being disposed within said casing and means in said casing for maintaining a substantially constant temperature in said casing preventing any disturbance caused by the external atmosphere, said last named means including a resistance-type heater element and a thermostat in said casing controlling the current flowing through said heater element whereby the temperature gradients around said vessel are reduced.

2. Sonic analyser as described in claim 1, said vessel being joined to said casing by a flexible suspension.

References Cited
UNITED STATES PATENTS

| | | | |
|---|---|---|---|
| 2,458,164 | 1/1949 | Hill et al. | 73—24 |
| 2,582,232 | 1/1952 | Cesaro et al. | 73—24 |
| 2,788,656 | 4/1957 | Sander | 73—24 |

RICHARD C. QUEISSER, *Primary Examiner.*

JAMES J. GILL, *Examiner.*

C. IRVIN McCLELLAND, *Assistant Examiner.*